US012722464B2

(12) United States Patent
Zeng et al.

(10) Patent No.: US 12,722,464 B2
(45) Date of Patent: Sep. 1, 2026

(54) VEHICLE WINDOW ASSEMBLY AND VEHICLE

(71) Applicant: FUYAO GLASS INDUSTRY GROUP CO., LTD., Fuqing (CN)

(72) Inventors: Dong Zeng, Fuqing (CN); Ke Zhang, Fuqing (CN); Qiming Lin, Fuqing (CN); Changhe Yu, Fuqing (CN); Ronglin Chen, Fuqing (CN); Liqiang Wang, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 318 days.

(21) Appl. No.: 18/428,498

(22) Filed: Jan. 31, 2024

(65) Prior Publication Data

US 2024/0217323 A1 Jul. 4, 2024

Related U.S. Application Data

(63) Continuation of application No. PCT/CN2022/109849, filed on Aug. 3, 2022.

(30) Foreign Application Priority Data

Aug. 4, 2021 (CN) ........................ 202110893765.2

(51) Int. Cl.
*B60J 10/76* (2016.01)
*B60J 10/30* (2016.01)

(52) U.S. Cl.
CPC ............... *B60J 10/76* (2016.02); *B60J 10/30* (2016.02)

(58) Field of Classification Search
CPC ................................. B60J 10/76; B60J 10/30
See application file for complete search history.

(56) References Cited

U.S. PATENT DOCUMENTS 3,466,803 A 9/1969 Packett
3,564,773 A * 2/1971 Bonnaud ................ B60J 10/365 52/204.591

(Continued)

FOREIGN PATENT DOCUMENTS

CN 204749820 U 11/2015
CN 208359884 U 1/2019

(Continued)

OTHER PUBLICATIONS

Notice of Registration dated Jun. 15, 2022 issued in CN 202110893765.2.

(Continued)

*Primary Examiner* — Faye M Fleming
(74) *Attorney, Agent, or Firm* — Scully, Scott, Murphy & Presser, P.C.

(57) ABSTRACT

A vehicle window assembly and a vehicle are provided in the present disclosure. The vehicle window assembly includes a glass plate, a guide rail, a mounting member, and a connecting member. The guide rail defines an accommodating space that has an opening facing a glass plate. At least part of the mounting member is disposed in the accommodating space. The mounting member defines a mounting hole in communication with the accommodating space. The connecting member has one end connected to the glass plate, and the other end penetrating through the mounting hole.

19 Claims, 10 Drawing Sheets

(56) References Cited

U.S. PATENT DOCUMENTS

| | | | | |
|---|---|---|---|---|
| 4,069,617 | A | 1/1978 | Koike | |
| 5,584,526 | A * | 12/1996 | Soldner | B60J 10/265<br>52/204.591 |
| 8,646,212 | B2 * | 2/2014 | Matsuwaki | B60J 10/30<br>49/492.1 |
| 9,688,128 | B2 * | 6/2017 | Timmermann | B60J 10/33 |
| 2001/0039763 | A1 | 11/2001 | Miyata | |
| 2024/0253438 | A1 * | 8/2024 | Lin | B60R 13/04 |

FOREIGN PATENT DOCUMENTS

| | | | |
|---|---|---|---|
| CN | 110014811 | A | 7/2019 |
| CN | 111546864 | A | 8/2020 |
| CN | 211942922 | U | 11/2020 |
| CN | 212765656 | U | 3/2021 |
| GB | 1190350 | A | 5/1970 |
| JP | H11294008 | A | 10/1999 |
| JP | 2001088548 | A | 4/2001 |

OTHER PUBLICATIONS

International Search Report dated Oct. 27, 2022 issued in PCT/CN2022/109849.

Extended European search report issued in corresponding European application No. 22852219.9 dated Oct. 28, 2024.

* cited by examiner

VEHICLE WINDOW ASSEMBLY AND VEHICLE

CROSS-REFERENCE TO RELATED APPLICATION(S)

This application is a continuation of International Application No. PCT/CN2022/109849, filed Aug. 3, 2022, which claims priority to Chinese Patent Application No. 202110893765.2, filed Aug. 4, 2021, the entire disclosures of which are incorporated herein by reference.

TECHNICAL FIELD

This disclosure relates to the field of manufacturing technology, and in particular to a vehicle window assembly and a vehicle.

BACKGROUND

With continuous improvement of living standards of people, requirements for styling and appearance of vehicles are getting higher and higher. Since integrated aluminum alloy guide rails have certain advantages compared to traditional guide rails in terms of appearance, assembly function, or strength, the integrated aluminum alloy guide rails are particularly appreciated by customers. Therefore, the aluminum alloy guide rails are widely used on door triangles, and more and more aluminum alloy guide rails are used in door triangles, and especially domestic well-known brands of vehicles or international mainstream vehicle manufacturers are increasingly using aluminum alloy guide rails to be integrated into the door triangles. However, an existing aluminum alloy guide rail has a relatively high cost and a relatively low assembly efficiency, and is easy to cause problems such as water leakage after being assembled, thereby greatly affecting the use experience of manufacturers and customers.

SUMMARY

In a first aspect of the present disclosure, a vehicle window assembly is provided. The vehicle window assembly includes a glass plate, a guide rail, and a mounting member. The guide rail defines an accommodating space. The accommodating space has an opening facing the glass plate. At least part of the mounting member is disposed in the accommodating space. The mounting member defines a mounting hole. The mounting hole is in communication with the accommodating space. The connecting member has one end connected to the glass plate, and the other end penetrating through the mounting hole.

In a second aspect of the present disclosure, a vehicle is provided. The vehicle includes a vehicle door. The vehicle door includes a door body and a vehicle window assembly. The vehicle window assembly is disposed on the door body. The vehicle window assembly includes a glass plate, a guide rail, and a mounting member. The guide rail defines an accommodating space. The accommodating space has an opening facing the glass plate. At least part of the mounting member is disposed in the accommodating space. The mounting member defines a mounting hole. The mounting hole is in communication with the accommodating space. The connecting member has one end connected to the glass plate, and the other end penetrating through the mounting hole.

BRIEF DESCRIPTION OF THE DRAWINGS

To describe technical solutions in implementations of the present disclosure more clearly, the following describes the accompanying drawings required to be used in the implementations of the present disclosure.

DETAILED DESCRIPTION

The following are preferred implementations of the present disclosure. It may be noted that those of ordinary skill in the art may further make improvements and modifications without departing from the principle of the present disclosure, and these improvements and modifications shall also belong to the scope of protection of the present disclosure.

Prior to introducing the technical solution of the present disclosure, the background problem in the related art is further introduced in detail.

With continuous improvement of living standards of people, requirements for styling and appearance of vehicles are getting higher and higher. Since integrated aluminum alloy guide rails have certain advantages compared to traditional guide rails in terms of appearance, assembly function, or strength, the integrated aluminum alloy guide rails are particularly appreciated by customers. Therefore, the aluminum alloy guide rails are widely used on door triangles, and more and more aluminum alloy guide rails are used in door triangles, and especially domestic well-known brands of vehicles or international mainstream vehicle manufacturers are increasingly using aluminum alloy guide rails to be integrated into the door triangles. However, an existing aluminum alloy guide rail has a relatively high cost and a relatively low assembly efficiency, and is easy to cause problems such as water leakage after being assembled, thereby greatly affecting the use experience of manufacturers and customers.

In the related art, many foam strips are often required to be attached to the interior of the existing aluminum alloy guide rail, so that the manufacturing costs of the aluminum alloy guide rail are always high. Meanwhile, to ensure the use strength of the existing aluminum alloy guide rail, the manufacturer generally assemble the aluminum alloy guide rail by means of a fixed connection method, so that it is difficult to assemble and disassemble the aluminum alloy guide rail conveniently, thereby greatly affecting the assembly efficiency, and also being unable to solve the problems of easy water leakage at the joint between the guide rail and the glass after being loaded. Therefore, it is necessary to provide a vehicle window assembly that is low in cost, convenient to assemble and disassemble, and less susceptible to water leakage.

Figure 1:
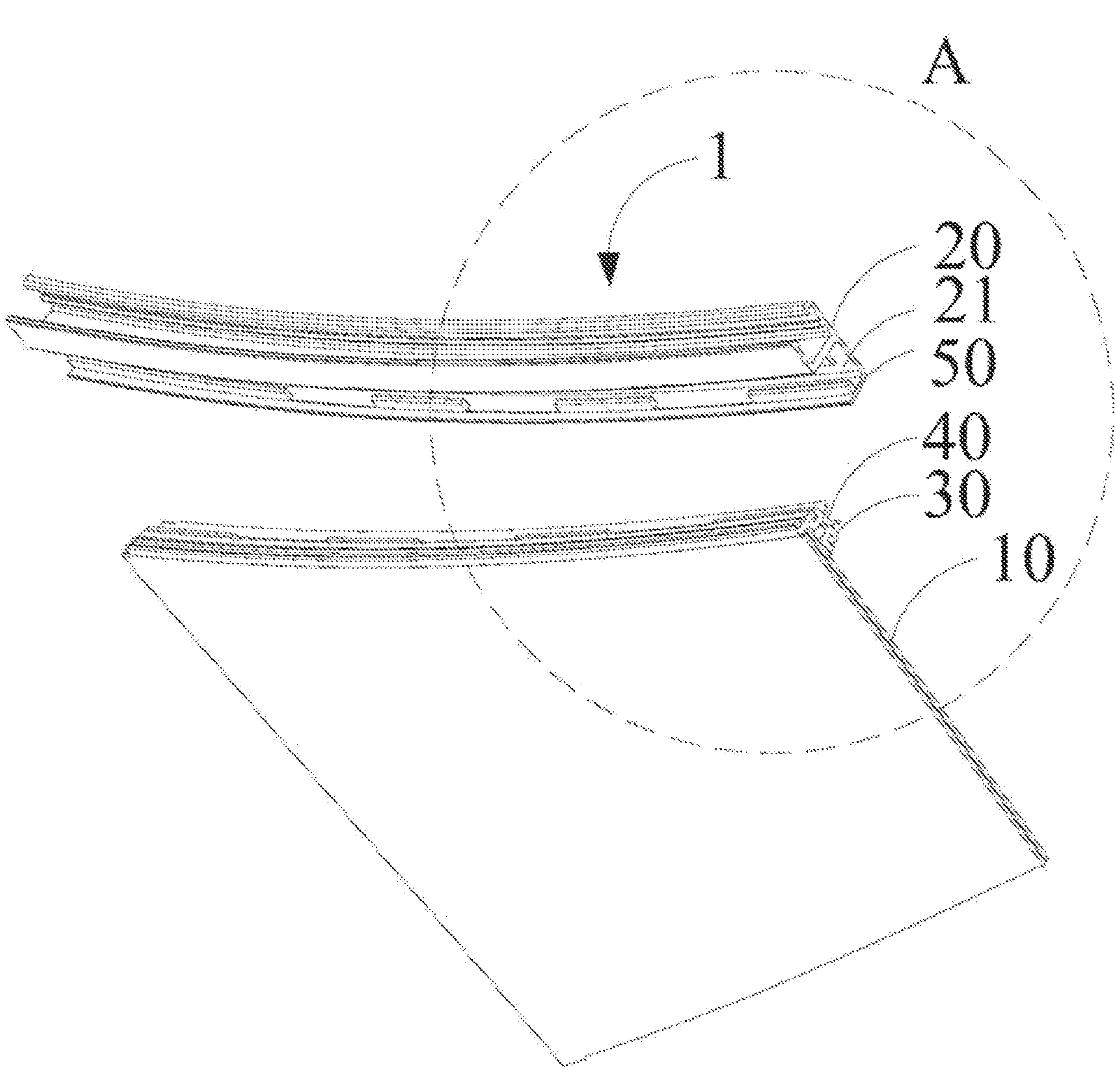
FIG. 1 is a schematic structural view of a vehicle window assembly according to an implementation of the present disclosure.
Figure 2:
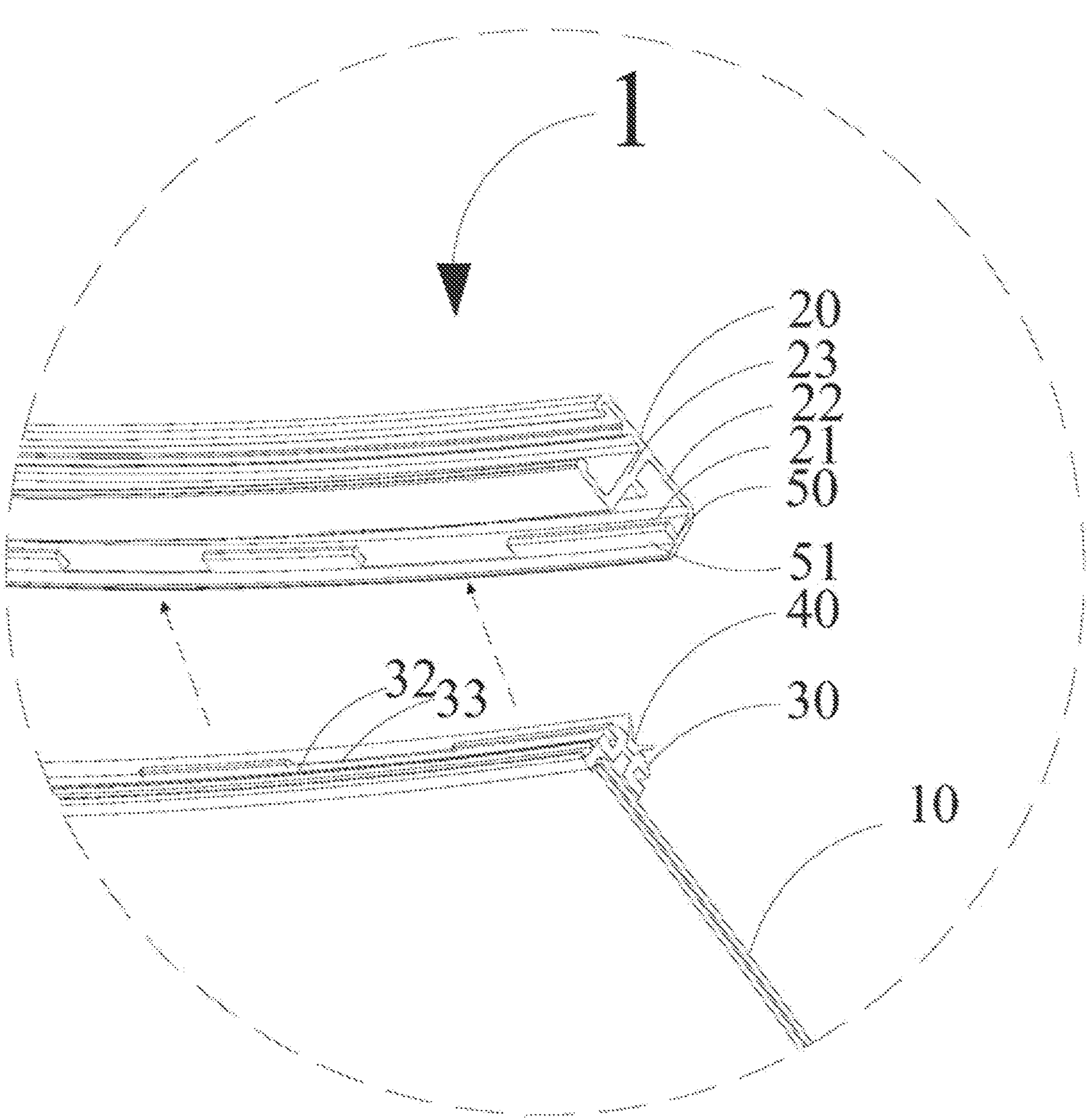
FIG. 2 is a partial schematic structural view of the vehicle window assembly in FIG. 1 in detail.
Figure 3:
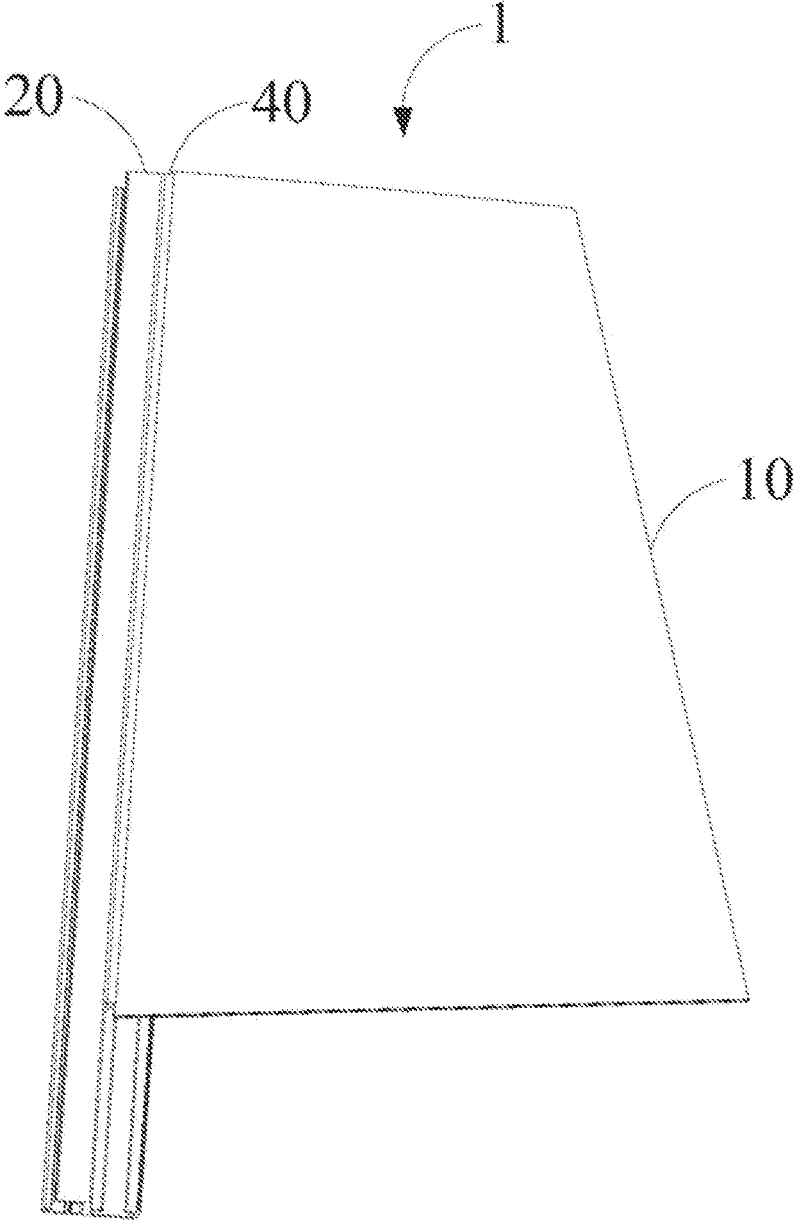
FIG. 3 is a schematic structural front view of the vehicle window assembly in FIG. 1.
Figure 4:
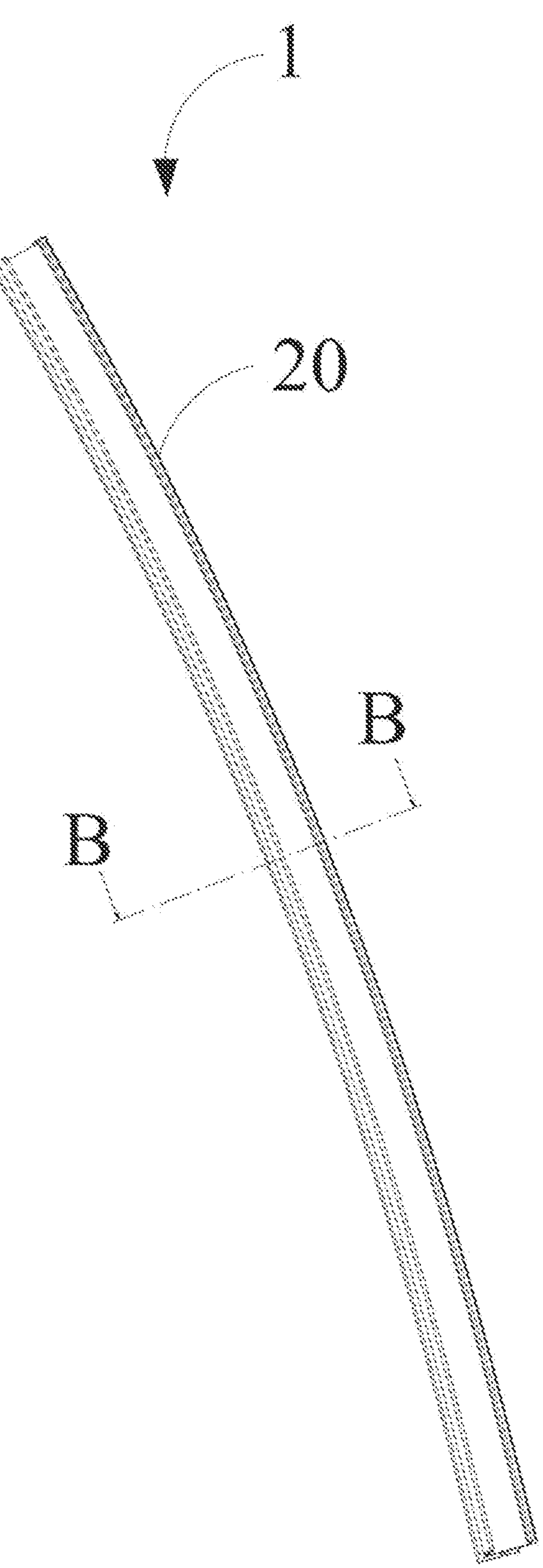
FIG. 4 is a schematic structural side view of the vehicle window assembly in FIG. 1.
Figure 5:
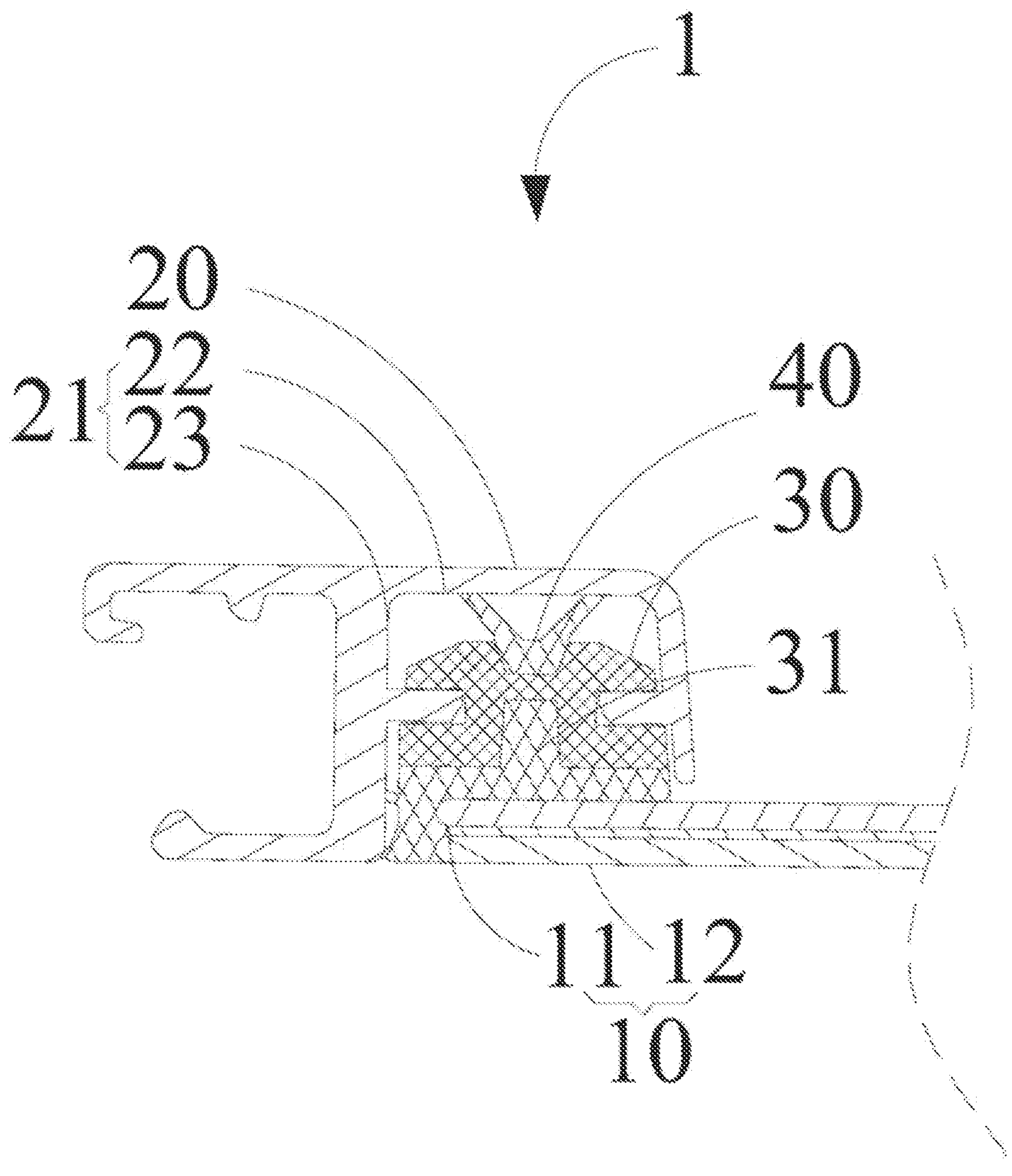
FIG. 5 is a schematic cross-sectional structural view of the vehicle window assembly in FIG. 4 taken along B-B.

In view of this, a vehicle window assembly 1 is provided in implementations of the present disclosure. Reference can be made to FIG. 1 to FIG. 5, where FIG. 1 is a schematic structural view of a vehicle window assembly according to an implementation of the present disclosure, FIG. 2 is a partial schematic structural view of the vehicle window assembly in FIG. 1 in detail, FIG. 3 is a schematic structural front view of the vehicle window assembly in FIG. 1, FIG. 4 is a schematic structural side view of the vehicle window assembly in FIG. 1, and FIG. 5 is a schematic cross-sectional structural view of the vehicle window assembly in FIG. 4 taken along B-B. The vehicle window assembly 1 includes a glass plate 10, a guide rail 20, a mounting member 30, and a connecting member 40. The guide rail 20 defines an accommodating space 21. The accommodating space 21 has an opening facing the glass plate 10. At least part of the mounting member 30 is disposed in the accommodating space 21. The mounting member 30 defines a mounting hole 31. The mounting hole 31 is in communication with the accommodating space 21. The connecting member 40 has one end connected to the glass plate 10, and the other end penetrating through the mounting hole 31.

The vehicle window assembly 1 provided in this implementation is mainly used in the field of vehicles, that is, after the vehicle window assembly 1 is assembled with a vehicle-body sheet metal mainly, a vehicle door is finally assembled with other components of the vehicle to form a vehicle. It may be understood that one side of the vehicle window assembly 1 facing an interior of the vehicle is one side of the glass plate 10 away from the mounting member 30, i.e., the outside of the vehicle; and one side of the vehicle window assembly 1 facing the interior of the vehicle is one side of the glass plate 10 close to the mounting member 30, i.e., the inside of the vehicle.

The vehicle window assembly 1 provided in this implementation includes the glass plate 10. A material of the glass plate 10 is usually glass. In addition, other structures may be disposed at the periphery of the glass to form the glass plate 10, which is not limited in the present disclosure. Optionally, the glass plate 10 provided in this implementation of the present disclosure has a light-transmitting surface 12 and an end surface 11. The light-transmitting surface 12 is configured for allowing light to pass through.

The vehicle window assembly 1 provided in this implementation further includes the guide rail 20. The guide rail 20 is configured to cooperate with the mounting member 30, the connecting member 40, and the glass plate 10, so as to implement assembly of the vehicle window assembly 1. In addition, the guide rail 20 may also be configured to cooperate with other components to mount an operable window, so that the window can slide to be liftable. In other words, part of the structure of the guide rail 20 is configured to cooperate to form the vehicle window assembly 1, i.e., the fixed window, and the other part of the guide rail 20 is configured to cooperate with other structures to form the operable window.

The guide rail 20 provided in this implementation defines the accommodating space 21. The opening of the accommodating space 21 faces the glass plate 10. Since the glass plate 10, the mounting member 30, and the connecting member 40 are structurally integrated, the assembly of the vehicle window assembly 1 can be realized only by disposing the at least part of the mounting member 30 in the accommodating space 21, which is convenient and quick, and has a relatively high assembly efficiency. Optionally, a material of the guide rail 20 includes, but is not limited to, aluminum alloy, etc.

Figure 9:
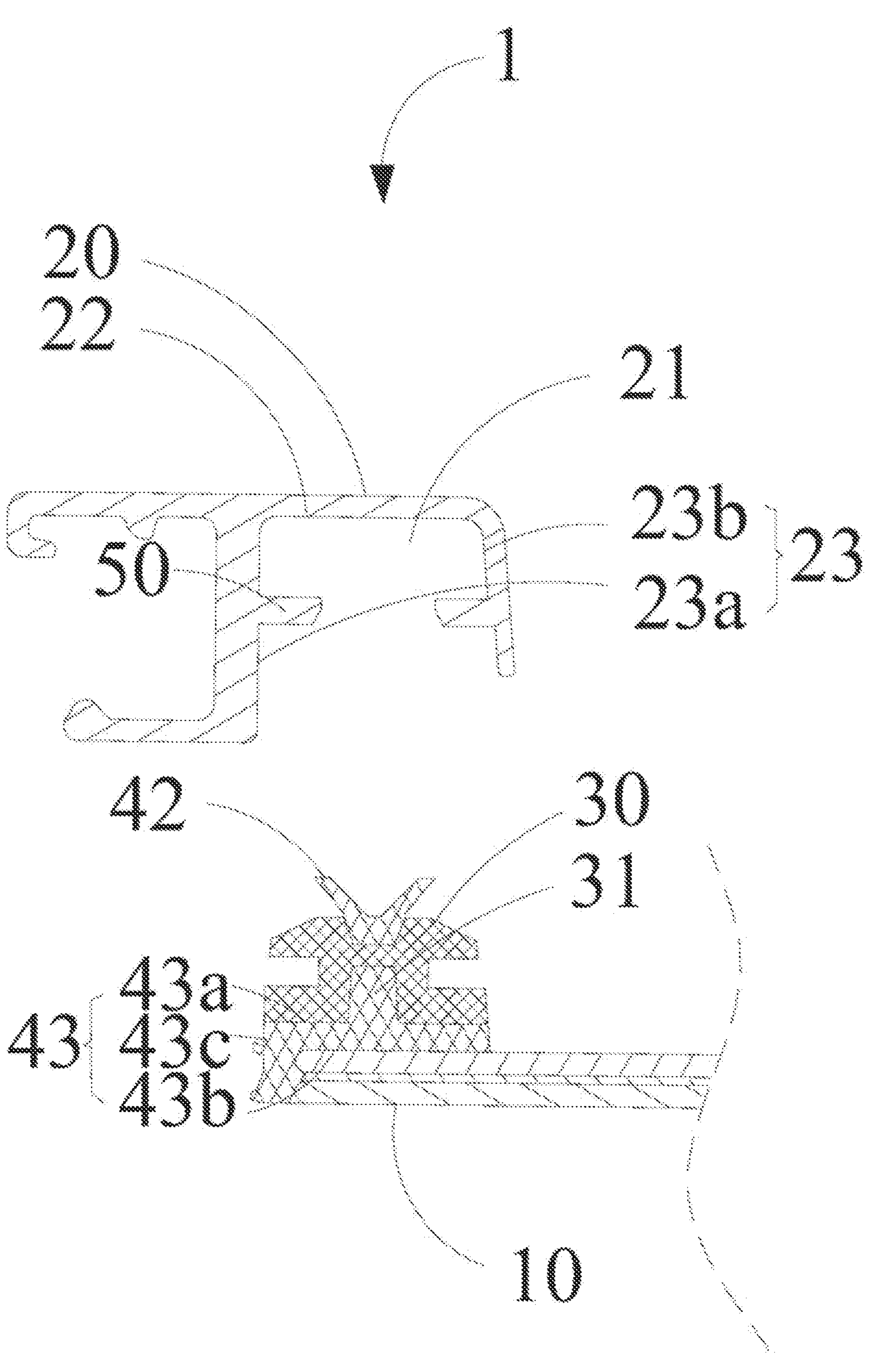
FIG. 9 is an exploded schematic structural view of a vehicle window assembly according to another implementation of the present disclosure.

Reference can be made to FIG. 9. Optionally, the accommodating space 21 provided in this implementation is defined by a bottom wall 22, a first sidewall 23*a*, and a second sidewall 23*b* opposite to the first sidewall 23*a*. A length of the first sidewall 23*a* is greater than a length of the second sidewall 23*b*. The first sidewall 23*a* is spaced apart from the end surface 11 of the glass plate 10.

The vehicle window assembly 1 provided in this implementation further includes the mounting member 30. It may be understood that in the present disclosure, the mounting member 30, the connecting member 40, and the glass plate 10 are of an integrated structure, and a specific forming process is the following. The mounting member 30 and the glass plate 10 are formed first, and then the connecting member 40 is additionally disposed between the mounting member 30 and the glass plate 10, so that the mounting member 30, the connecting member 40, and the glass plate 10 can be structurally integrated. In particular, a material of the mounting member 30 includes, but is not limited to, plastic, etc.

Optionally, the mounting hole 31 defined in this implementation penetrates through a surface of the mounting member 30 close to the glass plate 10 and a surface of the mounting member 30 close to the bottom wall 22.

The vehicle window assembly 1 provided in this implementation further includes a connecting member 40 having a triple effect of sealing, connecting, and buffering. Optionally, the connecting member 40 is made of a soft material, and one end of the connecting member 40 is connected to the glass plate 10 and the other end of the connecting member 40 penetrates through the mounting hole 31, that is, the connecting member 40 is connected to the glass plate 10 and the mounting member 30, so that a buffering effect can be realized between the mounting member 30 and the glass plate 10. In addition, since the connecting member 40 is connected to the glass plate 10 and the mounting member 30, the glass plate 10, the connecting member 40, and the mounting member 30 are structurally integrated, and the structural stability of the glass plate 10, the connecting member 40, and the mounting member 30 is improved, which is beneficial to improving the assembly efficiency between the guide rail 20 and the glass plate 10, the connecting member 40, and the mounting member 30.

According to the vehicle window assembly 1 provided in this implementation, the guide rail 20 defines the accommodating space 21 that has the opening facing the glass plate 10. The mounting member 30 defines the mounting hole 31 in communication with the accommodating space 21. The connecting member 40 has one end connected to the glass plate 10, and the other end penetrating through the mounting hole 31. Therefore, the glass plate 10, the connecting member 40, and the mounting member 30 can be structurally integrated, which is beneficial to improving the structural stability of the glass plate 10, the connecting member 40, and the mounting member 30. On this basis, only by arranging at least part of the mounting member 30 in the accommodating space 21, the assembly between the guide rail 20 and the glass plate 10, the connecting member 40, and the mounting member 30 can be realized, thereby effectively improving the assembly efficiency of the vehicle window assembly 1. In addition, since the glass plate 10, the connecting member 40, and the mounting member 30 are structurally integrated, connecting gaps between various components of the vehicle window assembly 1 can be further reduced, and moisture is prevented from entering through joints, which is beneficial to improving a waterproof performance of an internal structure of the vehicle window assembly 1, thereby improving the quality of the vehicle window assembly 1.

In an implementation, the accommodating space 21 has a bottom wall 22, and the other end of the connecting member 40 extends towards the bottom wall 22 of the accommodating space 21 and is in contact with the bottom wall 22. It may be understood that the other end of the connecting member 40 penetrates through the mounting hole 31 and is in contact with the bottom wall 22 of the accommodating space 21, so that the spacing between the mounting member 30 and the bottom wall 22 of the accommodating space 21 can be sealed, thereby preventing moisture from entering, and improving the waterproof performance of the vehicle window assembly 1.

In an implementation, one end of the connecting member 40 connected to the glass plate 10 is further in contact with the sidewall 23 of the accommodating space 21. Optionally, the sidewall 23 may refer to two sidewalls 23 opposite to each other, that is, one end of the connecting member 40 is connected to the glass plate 10 and the two sidewalls 23 of the accommodating space 2. The sidewall 23 may also refer to one of the two sidewalls 23. In this implementation, the accommodating space 21 has the first sidewall **23*a* and the second sidewall 23*b* opposite to the first sidewall 23*a*. The first sidewall 23*a* extends in a direction away from the bottom wall 22 to be spaced apart from the end surface 11 of the glass plate 10, and the sidewall 23 refers to the first sidewall 23*a*. In other words, one end of the connecting member 40 is connected to the glass plate 10 and the first sidewall 23*a*, to prevent water from entering from a joint between the glass plate 10 and the first sidewall 23*a*. In other implementations, the sidewall 23 may also refer to the second sidewall 23*b***.

In addition, a vehicle window assembly 1 is further provided in implementations of the present disclosure. Reference can continue to be made to FIG. 1 to FIG. 5. The vehicle window assembly 1 includes a glass plate 10, a guide rail 20, a mounting member 30, and a connecting member 40. The guide rail 20 defines an accommodating space 21. The accommodating space 21 has an opening facing the glass plate 10. At least part of the mounting member 30 is disposed in the accommodating space 21. The mounting member 30 is spaced part from a bottom wall 22 of the accommodating space 21. The mounting member 30 defines a mounting hole 31 in communication with the accommodating space 21. The connecting member 40 has one end connected to the glass plate 10 and the sidewall 23 of the accommodating space 21, and the other end penetrating through the mounting hole 31 and in contact with the bottom wall 22 of the accommodating space 21.

Optionally, the vehicle window assembly 1 provided in this implementation further includes the connecting member 40 having a triple effect of sealing, connecting, and buffering. Optionally, the connecting member 40 is made of a soft material, one end of the connecting member 40 is connected to the glass plate 10 and the sidewall 23 of the accommodating space 21, and the other end of the connecting member 40 penetrates through the mounting hole 31 and is in contact with the bottom wall 22 of the accommodating space 21, that is, the connecting member 40 is connected to the sidewall 23 of the accommodating space 21, the glass plate 10, and the mounting member 30. Therefore, a buffering effect can be realized between the glass plate 10 and the sidewall 23 of the accommodating space 21, and moisture can also be prevented from entering through a joint between the guide rail 20 and the glass plate 10.

It may be noted that the other end of the connecting member 40 penetrates through the mounting hole 31 and is in contact with the bottom wall 22 of the accommodating space 21. Since the mounting member 30 is spaced apart from the bottom wall 22 of the accommodating space 21, when the other end of the connecting member 40 penetrates through the mounting hole 31 and is in contact with the bottom wall 22 of the accommodating space 21, the spacing between the mounting member 30 and the bottom wall 22 of the accommodating space 21 can be sealed, thereby preventing moisture from entering, and improving the waterproof performance of the vehicle window assembly 1.

In addition, one end of the connecting member 40 is connected to the glass plate 10 and the sidewall 23 of the accommodating space 21, and the sidewall 23 may refer to two sidewalls 23 opposite to each other. In other words, one end of the connecting member 40 is connected to the two sidewalls 23 of the glass plate 10 and the accommodating space 21. The sidewall 23 may also refer to one of the two sidewalls 23. In this implementation, the accommodating space 21 has a first sidewall **23*a* and a second sidewall 23*b* opposite to the first sidewall 23*a*. The first sidewall 23*a* extends in a direction away from the bottom wall 22 to be spaced apart from the end surface 11 of the glass plate 10, and the sidewall 23 refers to the first sidewall 23*a*. In other words, one end of the connecting member 40 is connected to the glass plate 10 and the first sidewall 23*a*, to prevent water from entering through a joint between the glass plate 10 and the first sidewall 23*a*. In other implementations, the sidewall 23 may also refer to the second sidewall 23*b***.

According to the vehicle window assembly 1 provided in the present disclosure, the guide rail 20 defines the accommodating space 21 that has the opening facing the glass plate 10. The at least part of the mounting member 30 is disposed in the accommodating space 21. The mounting member 30 is spaced apart from the bottom wall 22 of the accommodating space 21. The mounting member 30 defines the mounting hole 31 in communication with the accommodating space 21. One end of the connecting member 40 is connected to the glass plate 10 and the sidewall 23 of the accommodating space 21, which is beneficial to improving the waterproof performance at a joint between the glass plate 10 and the guide rail 20. The other end of the connecting member 40 penetrates through the mounting hole 31 and is in contact with the bottom wall 22 of the accommodating space 21, which can realize structural integration of the glass plate 10, the connecting member 40, and the mounting member 30, improve the structural stability of the glass plate 10, the connecting member 40, and the mounting member 30, and is beneficial to improving the assembly efficiency of the guide rail 20 and the glass plate 10, the connecting member 40, and the mounting member 30. Meanwhile, the contact between the other end of the connecting member 40 and the bottom wall 22 of the accommodating space 21 can also seal the interior of the guide rail 20, so that the waterproof performance of the internal structure of the vehicle window assembly 1 is further improved, thereby improving the quality of the vehicle window assembly 1.

Figure 6:
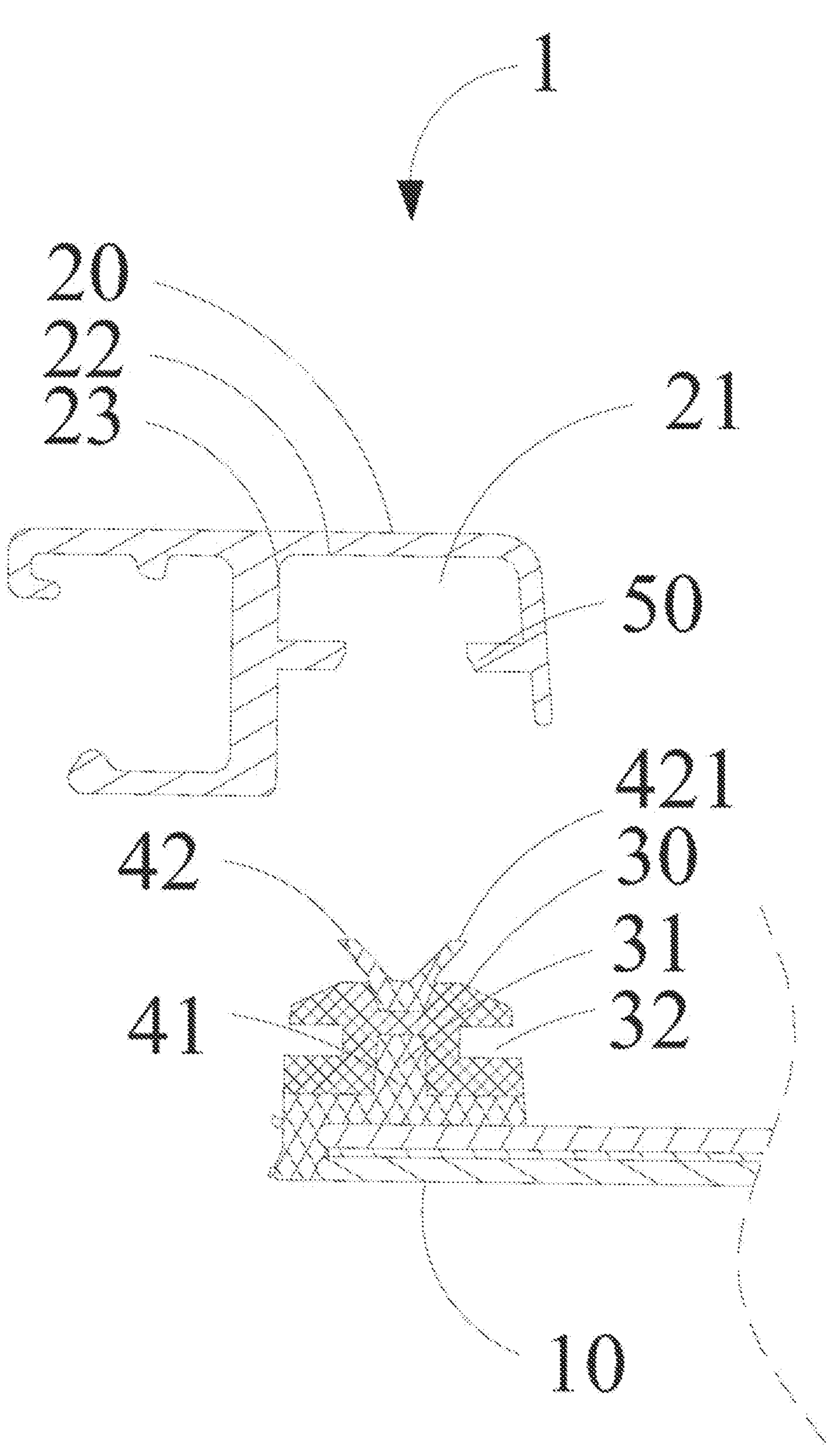
FIG. 6 is an exploded schematic structural view of a vehicle window assembly according to an implementation of the present disclosure.

Reference can be made to FIG. 6, which is an exploded schematic structural view of a vehicle window assembly according to an implementation of the present disclosure. In this implementation, the connecting member 40 includes a filling portion 41 and a sealing portion 42 connected to the filling portion 41. At least part of the filling portion 41 penetrates through the mounting hole 31. The sealing portion 42 is closer to the bottom wall 22 than the filling portion 41. The sealing portion 42 is disposed outside the mounting hole 31. The sealing portion 42 has one end that is away from the filling portion 41 and in contact with the bottom wall 22. It may be understood that the at least part of the filling portion 41 penetrates through the mounting hole 31, the sealing portion 42 connected to the filling portion 41 is closer to the bottom wall 22 than the filling portion 41, the sealing portion 42 is disposed outside the mounting hole 31, and one end of the sealing portion 42 away from the filling portion 41 is in contact with the bottom wall 22, so that the other end of the connecting member 40 can penetrate through the mounting hole 31 and be in contact with the bottom wall 22 of the accommodating space 21. On the basis that the connecting member 40 provided in this implementation has a connecting function, the sealing portion 42 connected to the filling portion 41 is disposed, so that the interior of the vehicle window assembly 1 can be directly sealed by using the sealing portion 42 of the connecting member 40, thereby avoiding a foam design in the related art and reducing costs.

In addition, since the sealing portion 42 is part of the structure of the connecting member 40, the structural integration can also be ensured. Therefore, the cooperative between the mounting member 30, the connecting member 40, and the glass plate 10 that are integrated and the guide rail 20 is only required to realize assembly, and the waterproof performance of the interior of the vehicle window assembly 1 can be ensured even without foam.

Reference can continue to be made to FIG. 6. In this implementation, the sealing portion 42 includes at least two sealing lips 421. The at least two sealing lips 421 each are connected to the filling portion 41. The accommodating space 21 has a sidewall 23. The sidewall 23 includes a first sidewall 23*a* and a second sidewall 23*b*. At least one of the at least two sealing lips 421 extends towards the first sidewall 23*a* and is in contact with the bottom wall 22. At least one of the at least two sealing lips 421 extends towards the second sidewall 23*b* and is in contact with the bottom wall 22. It may be understood that when moisture enters through the joint between the glass plate 10 and the guide rail 20, the moisture may enter the spacing between the mounting member 30 and the bottom wall 22 of the accommodating space 21. Here, since the spacing is sealed by the at least two sealing lips 421 that extend in different directions and each are in contact with the bottom wall 22, the water cannot continue to penetrate through the spacing and cannot enter the interior of the vehicle.

Figure 7:
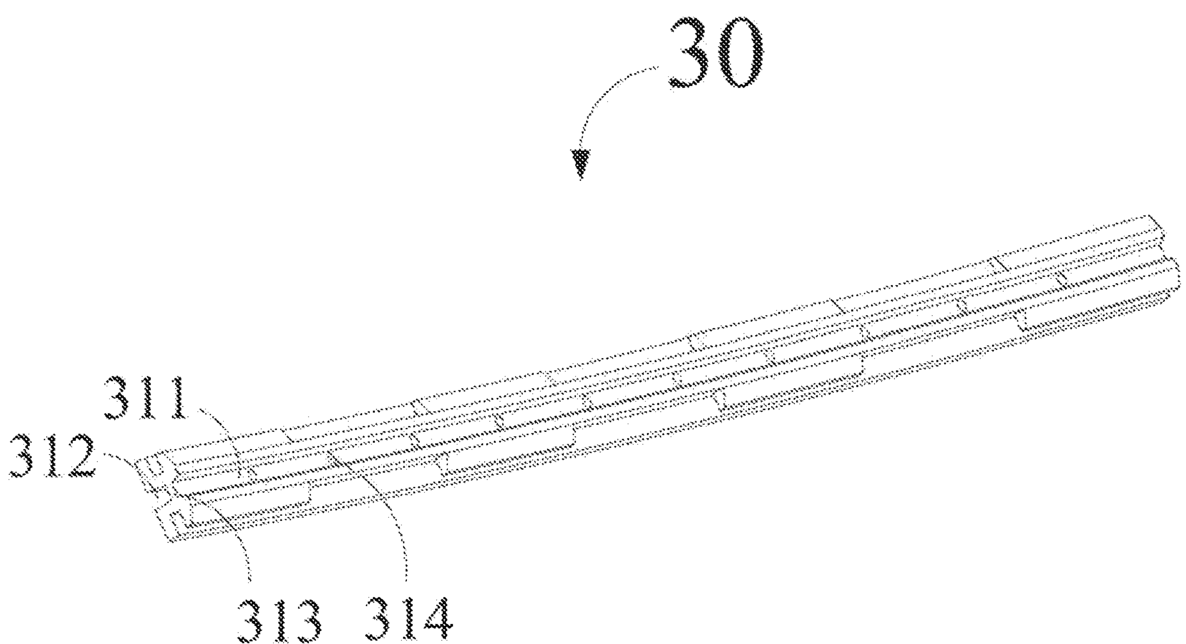
FIG. 7 is a schematic structural view of a mounting member according to an implementation of the present disclosure.

Reference can be made to FIG. 7, which is a schematic structural view of a mounting member according to an implementation of the present disclosure. In this implementation, the mounting member 30 defines a first groove 311 having an opening facing the bottom wall 22 of the accommodating space 21, and a second groove 312 having an opening facing the glass plate 10, and includes a mounting portion 313 disposed between the first groove 311 and the second groove 312. The mounting portion 313 defines a through-hole 314 in communication with the first groove 311 and the second groove 312. The first groove 311, the second groove 312, and the through-hole 314 cooperatively define the mounting hole 31. Specifically, the other end of the connecting member 40 penetrates through the mounting hole 31 and is in contact with the bottom wall 22 of the accommodating space 21, which may be understood as that in addition to penetrating through the mounting hole 31 and filling the mounting hole 31, the other end of the connecting member 40 is also in contact with the bottom wall 22 of the accommodating space 21. It may be understood that the first groove 311 is in communication with the second groove 312 via the through-hole 314, the other end of the connecting member 40 is disposed in both the first groove 311 and the second groove 312, and the middle part of the connecting member 40 is limited by the through-hole 314 to prevent the connecting member 40 from moving in the mounting hole 31, which is beneficial to improving the structural stability of the interior of the vehicle window assembly 1.

Reference can continue to be made to FIG. 7. In an implementation, there may be at least two through-holes 314, and the at least two through-holes 314 are defined at intervals in the mounting portion 313 in an extension direction of the mounting member 30. It may be understood that the other end of the connecting member 40 is disposed in both the first groove 311 and the second groove 312, and the middle part of the connecting member 40 is limited by the multiple through-holes 314 to further prevent the connecting member 40 from moving in the mounting hole 31.

Figure 8:
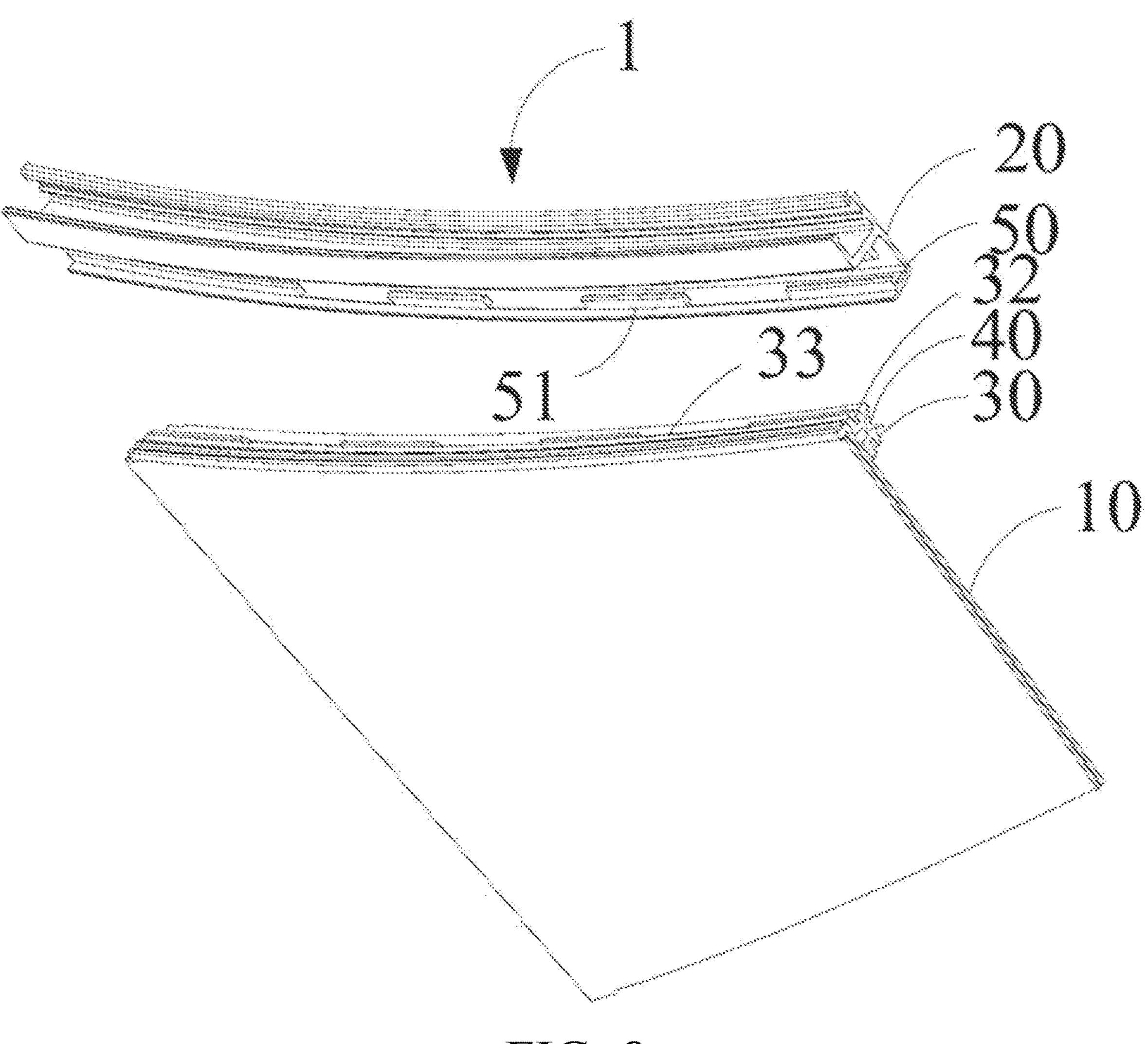
FIG. 8 is a schematic structural view of a vehicle window assembly according to another implementation of the present disclosure.

Reference can be made to FIG. 8 to FIG. 9 together, where FIG. 8 is a schematic structural view of a vehicle window assembly according to another implementation of the present disclosure, and FIG. 9 is an exploded schematic structural view of a vehicle window assembly according to another implementation of the present disclosure. The vehicle window assembly 1 includes a limiting member 50 disposed on a sidewall 23 of the accommodating space 21. The limiting member 50 is disposed in a direction parallel to an extension direction of the guide rail 20. The mounting member 30 defines a first limiting groove 32 at a peripheral side end 43*c* of the mounting member 30 close to the sidewall 23, and the first limiting groove 32 is corresponding to the limiting member 50. Aat least part of the limiting member 50 is disposed in the first limiting groove 32.

Reference can continue to be made to FIG. 2 and FIG. 7. Optionally, in another implementation, the limiting member 50 is disposed on two sidewalls 23 that are opposite to each other in the accommodating space 21. The first limiting groove 32 corresponding to the limiting member 50 is defined at two sides of the mounting member 30. At least part of the limiting member 50 is disposed in the first limiting groove 32, so that at least part of the mounting member 30 can be limited in the accommodating space 21 of the guide rail 20, to realize quick assembly of the vehicle window assembly 1, which is beneficial to improving the assembly efficiency of the vehicle window assembly 1.

Reference can continue to be made to FIG. 2, FIG. 8, and FIG. 9. In an implementation, the limiting member 50 includes multiple limiting portions 51 arranged at intervals. The mounting member 30 defines multiple second limiting grooves 33 at one end of the mounting member 30 away from the glass plate 10, and multiple second limiting grooves 33 are in a one-to-one correspondence with the multiple limiting portions 51. The multiple second limiting grooves 33 are in communication with the first limiting groove 32. A length of each of the multiple second limiting grooves 33 in an extension direction of the mounting member 30 is no less than a length of a corresponding limiting portion 51 in the extension direction of the guide rail 20. It may be understood that the length of the second limiting groove 33 in the extension direction of the mounting member 30 is not less than the length of the limiting portion 51 in the extension direction of the guide rail 20, and the second limiting groove 33 is in communication with the first limiting groove 32, so that the limiting portion 51 can enter the first limiting groove 32 via the second limiting groove 33, and then the limiting portion 51 slides in the first limiting groove 32, to make the limiting portion 51 be snapped into the first limiting groove 32 at both the upper and lower sides of the limiting portion 51. It may be understood that in this implementation, by the cooperation between the limiting portion 51 of the guide rail 20 and the second limiting groove 33 and the first limiting groove 32 of the mounting member 30, the at least part of the mounting member 30 is mounted in the accommodating space 21 of the guide rail 20, and the assembly efficiency of the vehicle window assembly 1 is improved.

Reference can continue to be made to FIG. 9. It may be noted that in another implementation, the limiting member 50 is disposed on the two sidewalls 23 that are opposite to each other in the accommodating space 21. The first limiting groove 32 corresponding to the limiting member 50 is defined at the two sides of the mounting member 30, and the limiting member 50 on the two sidewalls 23 also defines the multiple limiting portions 51 arranged at intervals, so that the limiting portion 51 can also enter the first limiting groove 32 via the second limiting groove 33, to realize the cooperation between the mounting member 30 and the guide rail 20 from two sides. In this implementation, due to the simultaneous assembly at the two sides of the mounting member 30, it can be ensured that the at least part of the mounting member 30 is better disposed in the accommodating space 21. Therefore, during disassembly, the limiting portion 51 can be slid to a position corresponding to the second limiting groove 33 and be disassembled, which is beneficial to further improving the assembly efficiency of the vehicle window assembly 1 and the structural stability of the vehicle window assembly 1 assembled.

In addition, in this implementation, since the glass plate 10, the connecting member 40, and the mounting member 30 are structurally integrated, the vehicle window assembly 1 can be assembled in one step by assembly-cooperation of the limiting portion 51 with the first limiting groove 32 and the second limiting groove 33, which is convenient and quick, and greatly saves the assembly time. Meanwhile, the vehicle window assembly 1 can be assembled only by connecting the mounting member 30 with the guide rail 20, and there is only one connecting structure, so that neither falling off or looseness is easy to occur during long-term use, and the stability of the whole structure of the vehicle window assembly 1 can also be ensured.

In another implementation, two ends of the mounting member 30 at one side of the mounting member 30 close to the bottom wall 22 are chamfered, so that the mounting member 30 can enter the accommodating space 21 more easily, and the limiting portion 51 can enter the first limiting groove 32 more easily via the second limiting groove 33.

Figure 10:
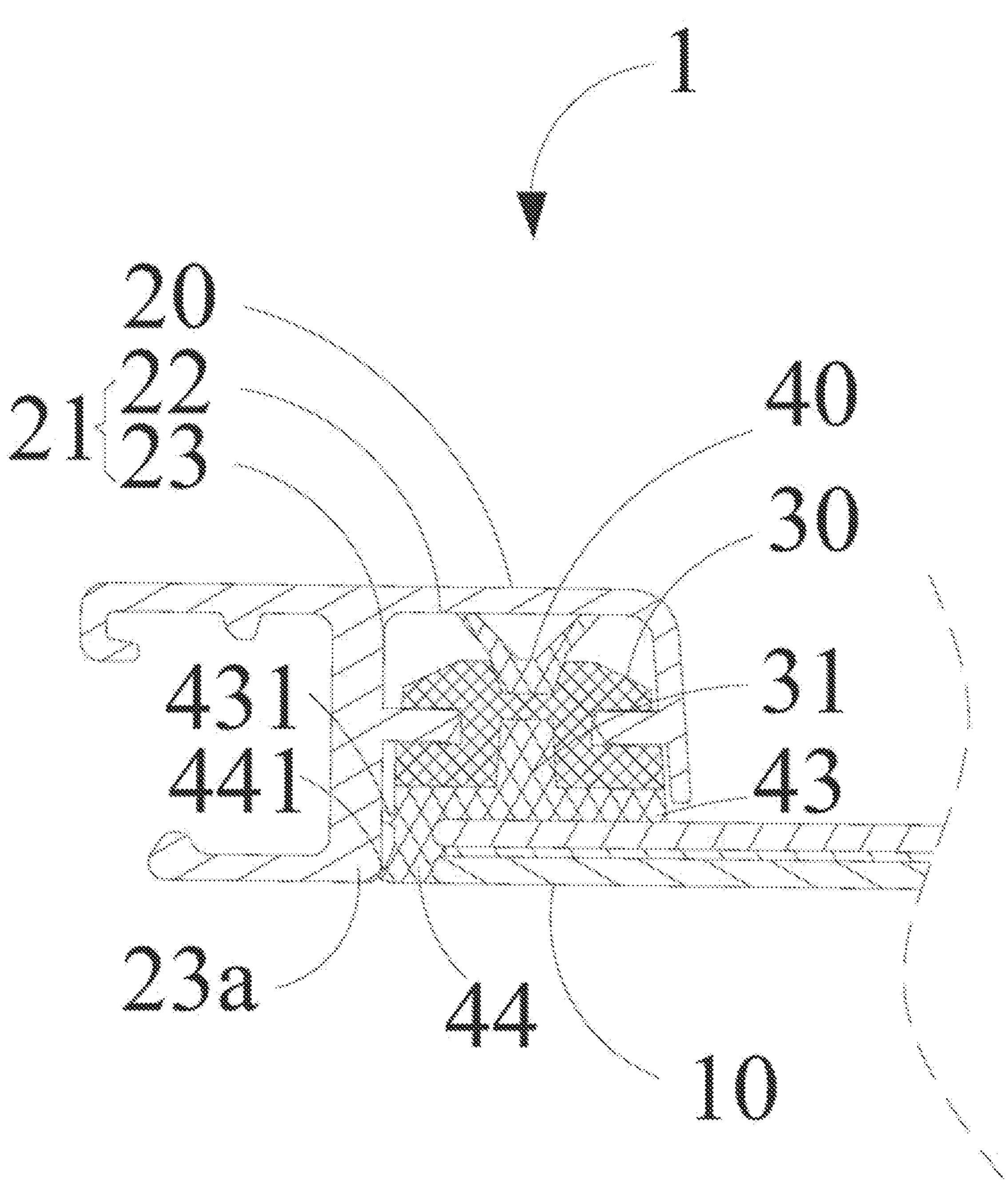
FIG. 10 is a schematic cross-sectional structural view of a vehicle window assembly according to another implementation of the present disclosure.

Reference can be made to FIG. 9 and FIG. 10 together, where FIG. 10 is a schematic cross-sectional structural view of a vehicle window assembly according to another implementation of the present disclosure. In this implementation, the connecting member 40 includes a first connecting portion 43. The sidewall 23 includes a first sidewall 23*a* and a second sidewall 23*b* opposite to first sidewall 23*a*. The first connecting portion 43 is disposed outside the mounting hole 31. The first connecting portion 43 is closer to the glass plate 10 than the mounting member 30. The first connecting portion 43 has a first end 43*a* and a second end 43*b* opposite to the first end 43*a*, and a peripheral side end 43*c* connected to the first end 43*a* and the second end 43*b*. The first end 43*a* is connected to the mounting member 30. The second end 43*b* is connected to the glass plate 10 at one side of the glass plate 10 close to the bottom wall 22 of the accommodating space 21. The peripheral side end 43*c* is in contact with the first sidewall 23*a* at one side of the peripheral side end 43*c* facing the first sidewall 23*a*. The glass plate 10 is spaced apart from the first sidewall 23*a* at one side of the glass plate 10 close to the first sidewall 23*a*. Specifically, the first end 43*a* of the first connecting portion 43 is connected to the mounting member 30, and the second end 43*b* is connected to the glass plate 10 at one side of the glass plate 10 close to the bottom wall 22, so that the glass plate 10 is connected to the mounting member 30. In addition, since one end of the peripheral side end 43*c* is in contact with the first sidewall 23*a*, when water enters through a joint between the glass plate 10 and the first sidewall 23*a*, the water can be blocked out of the first connecting portion 43, which is beneficial to improving the waterproof performance of the vehicle window assembly 1.

Reference can continue to be made to FIG. 10. In another implementation, the first connecting portion 43 further includes a first connecting lip 431. The first connecting lip 431 is disposed at one side of the peripheral side end 43*c* close to the first sidewall 23*a*, and is in contact with the first sidewall 23*a*. Therefore, moisture is prevented from entering, and a contact area between the first connecting portion 43 and the first sidewall 23*a* is reduced, thereby reducing friction force between the first connecting portion 43 and the first sidewall 23*a*, and realizing easier disassembly between the first connecting portion 43 and the first sidewall 23*a*.

Reference can continue to be made to FIG. 10. In this implementation, the connecting member 40 further includes a second connecting portion 44. The second connecting portion 44 is connected to the first connecting portion 43. The second connecting portion 44 is farther away from the mounting member 30 than the first connecting portion 43. The second connecting portion 44 is disposed between the first sidewall 23*a* and the side of the glass plate 10 close to the first sidewall 23*a*. It may be understood that since the second connecting portion 44 is disposed between the glass plate 10 and the first sidewall 23*a*, moisture can be directly blocked out of the vehicle window assembly 1, and moisture cannot enter through the joint between the glass plate 10 and the first sidewall 23*a*, which is beneficial to further improving the waterproof performance of the vehicle window assembly 1.

Reference can continue to be made to FIG. 10. In another implementation, the second connecting portion 44 further includes a second connecting lip 441 at one side of the second connecting portion 44 close to the first sidewall 23*a*. The second connecting lip 441 is in contact with the first sidewall 23*a*. Therefore, moisture is prevented from entering, and a contact area between the second connecting portion 44 and the first sidewall 23*a* is reduced, thereby reducing friction force between the second connecting portion 44 and the first sidewall 23*a*, and realizing easier disassembly between the second connecting portion 44 and the first sidewall 23*a*.

Reference can continue to be made to FIG. 10. In this implementation, a surface of the second connecting portion 44 away from the mounting member 30 is flush with a surface of the first sidewall 23*a* away from the bottom wall 22 and a surface of the glass plate 10 away from the mounting member 30. It may be understood that one side of the glass plate 10 away from the mounting member 30 is the exterior of the vehicle. Therefore, the surface of the second connecting portion 44 away from the mounting member 30 is flush with the surface of the first sidewall 23*a* away from the bottom wall 22 and the surface of the glass plate 10 away from the mounting member 30, so that an external connecting gap between the guide rail 20 and each of the connecting member 40 and the glass plate 10 can be reduced, which is beneficial to improving the waterproof performance and aesthetics of the vehicle window assembly 1.

To sum up, mounting and manufacturing steps of the vehicle window assembly 1 provided in the above implementations are substantially as follows. The guide rail 20, the mounting member 30, and the glass plate 10 are manufactured first, and then the connecting member 40 is manufactured between the mounting member 30 and the glass plate 10, to make the mounting member 30, the glass plate 10, and the connecting member 40 be structurally integrated. The at least part of the mounting member 30 is disposed in the accommodating space 21 of the guide rail 20 by the cooperation between the limiting member 50 and the first limiting groove 32, and at this time, the sealing portion 42 is in contact with the bottom wall 22 of the accommodating space 21, and the connecting member 40 connects the guide rail 20 with the glass plate 10, thereby completing assembly.

A vehicle is further provided in an implementation of the present disclosure. The vehicle includes a door. The door includes a door body and the above window assembly 1. The vehicle window assembly 1 is disposed on the door body.

According to the vehicle provided in this implementation of the present disclosure, with adoption of the vehicle window assembly 1 provided in the first aspect of the present disclosure, the assembly efficiency of the vehicle window assembly 1 and the waterproof performance of the vehicle window assembly 1 are improved, thereby improving the quality of the vehicle.

The contents provided in implementations of the present disclosure are described in detail above, and the principle and implementations of the present disclosure are illustrated and explained herein. The above description is only used to help understand the method and core ideas of the present disclosure. Meanwhile, for those of ordinary skill in the art, modifications may be made to the specific implementations and application scope according to the idea of the present disclosure. To sum up, the contents of the specification shall not be construed as a limitation to the present disclosure.

What is claimed is:

1. A vehicle window assembly comprising:

a glass plate;

a guide rail defining an accommodating space, wherein the accommodating space has an opening facing the glass plate;

a mounting member, wherein at least part of the mounting member is disposed in the accommodating space, the mounting member defines a mounting hole, and the mounting hole is in communication with the accommodating space; and a connecting member, wherein the connecting member has one end connected to the glass plate, and the other end penetrating through the mounting hole, wherein the end of the connecting member connected to the glass plate is further in contact with a sidewall of the accommodating space.

2. The vehicle window assembly of claim 1, wherein the accommodating space has a bottom wall, and the other end of the connecting member extends towards the bottom wall and is in contact with the bottom wall.

3. The vehicle window assembly of claim 2, wherein the connecting member comprises a filling portion and a sealing portion connected to the filling portion, at least part of the filling portion penetrates through the mounting hole, the sealing portion is closer to the bottom wall than the filling portion, the sealing portion is disposed outside the mounting hole, and the sealing portion has one end that is away from the filling portion and in contact with the bottom wall.

4. The vehicle window assembly of claim 3, wherein the sealing portion comprises at least two sealing lips, the at least two sealing lips each are connected to the filling portion, the accommodating space has a sidewall, the sidewall comprises a first sidewall and a second sidewall opposite to the first sidewall, at least one of the at least two sealing lips extends towards the first sidewall and is in contact with the bottom wall, and at least one of the at least two sealing lips extends towards the second sidewall and is in contact with the bottom wall.

5. The vehicle window assembly of claim 1, wherein the mounting member defines a first groove having an opening facing a bottom wall of the accommodating space, and a second groove having an opening facing the glass plate, and comprises a mounting portion disposed between the first groove and the second groove, the mounting portion defines a through-hole in communication with the first groove and the second groove, and the first groove, the second groove, and the through-hole cooperatively define the mounting hole.

6. The vehicle window assembly of claim 1, wherein the vehicle window assembly comprises a limiting member disposed on the sidewall of the accommodating space, the limiting member is disposed in a direction parallel to an extension direction of the guide rail, the mounting member defines a first limiting groove at a peripheral side end of the mounting member close to the sidewall, the first limiting groove is corresponding to the limiting member, and at least part of the limiting member is disposed in the first limiting groove.

7. The vehicle window assembly of claim 6, wherein the limiting member comprises a plurality of limiting portions arranged at intervals, the mounting member defines a plurality of second limiting grooves at one end of the mounting member away from the glass plate, the plurality of second limiting grooves are in a one-to-one correspondence with the plurality of limiting portions, the plurality of second limiting grooves are in communication with the first limiting groove, and a length of each of the plurality of second limiting grooves in an extension direction of the mounting member is no less than a length of a corresponding limiting portion in the extension direction of the guide rail.

8. The vehicle window assembly of claim 1, wherein the connecting member comprises a first connecting portion, the sidewall comprises a first sidewall and a second sidewall opposite to the first sidewall, the first connecting portion is disposed outside the mounting hole, the first connecting portion is closer to the glass plate than the mounting member, the first connecting portion has a first end and a second end opposite to the first end, and a peripheral side end connected to the first end and the second end, the first end is connected to the mounting member, the second end is connected to the glass plate at one side of the glass plate close to a bottom wall of the accommodating space, the peripheral side end is in contact with the first sidewall at one side of the peripheral side end facing the first sidewall, and the glass plate is spaced apart from the first sidewall at one side of the glass plate close to the first sidewall.

9. The vehicle window assembly of claim 8, wherein the connecting member further comprises a second connecting portion connected to the first connecting portion, the second connecting portion is farther away from the mounting member than the first connecting portion, and the second connecting portion is disposed between the first sidewall and the side of the glass plate close to the first sidewall.

10. The vehicle window assembly of claim 9, wherein a surface of the second connecting portion away from the mounting member is flush with a surface of the first sidewall away from the bottom wall and a surface of the glass plate away from the mounting member.

11. The vehicle window assembly of claim 1, wherein the connecting member comprises a first connecting portion, the sidewall comprises a first sidewall and a second sidewall opposite to the first sidewall, the first connecting portion is disposed outside the mounting hole, the first connecting portion is closer to the glass plate than the mounting member, the first connecting portion has a first end and a second end opposite to the first end, and a peripheral side end connected to the first end and the second end, the first end is connected to the mounting member, the second end is connected to the glass plate at one side of the glass plate close to a bottom wall of the accommodating space, the first connecting portion further comprises a first connecting lip, the first connecting lip is disposed at one side of the peripheral side end close to the first sidewall, and is in contact with the first sidewall, and the glass plate is spaced apart from the first sidewall at one side of the glass plate close to the first sidewall.

12. The vehicle window assembly of claim 11, wherein the connecting member further comprises a second connecting portion connected to the first connecting portion, the second connecting portion is farther away from the mounting member than the first connecting portion, the second connecting portion is disposed between the first sidewall and the side of the glass plate close to the first sidewall, the second connecting portion further comprises a second connecting lip at one side of the second connecting portion close to the first sidewall, and the second connecting lip is in contact with the first sidewall.

13. The vehicle window assembly of claim 1, wherein two ends of the mounting member at one side of the mounting member close to a bottom wall of the accommodating space are chamfered.

14. A vehicle comprising a door, wherein the door comprises a door body and a vehicle window assembly, and the vehicle window assembly is disposed on the door body; wherein the vehicle window assembly comprises:

a glass plate;

a guide rail defining an accommodating space, wherein the accommodating space has an opening facing the glass plate;

a mounting member, wherein at least part of the mounting member is disposed in the accommodating space, the mounting member defines a mounting hole, and the mounting hole is in communication with the accommodating space; and a connecting member, wherein the connecting member has one end connected to the glass plate, and the other end penetrating through the mounting hole, wherein the end of the connecting member connected to the glass plate is further in contact with a sidewall of the accommodating space.

15. The vehicle of claim 14, wherein the accommodating space has a bottom wall, and the other end of the connecting member extends towards the bottom wall and is in contact with the bottom wall.

16. The vehicle of claim 15, wherein the connecting member comprises a filling portion and a sealing portion connected to the filling portion, at least part of the filling portion penetrates through the mounting hole, the sealing portion is closer to the bottom wall than the filling portion, the sealing portion is disposed outside the mounting hole, and the sealing portion has one end that is away from the filling portion and in contact with the bottom wall.

17. The vehicle of claim 16, wherein the sealing portion comprises at least two sealing lips, the at least two sealing lips each are connected to the filling portion, the accommodating space has a sidewall, the sidewall comprises a first sidewall and a second sidewall opposite to the first sidewall, at least one of the at least two sealing lips extends towards the first sidewall and is in contact with the bottom wall, and at least one of the at least two sealing lips extends towards the second sidewall and is in contact with the bottom wall.

18. The vehicle of claim 14, wherein the mounting member defines a first groove having an opening facing a bottom wall of the accommodating space, and a second groove having an opening facing the glass plate, and comprises a mounting portion disposed between the first groove and the second groove, the mounting portion defines a through-hole in communication with the first groove and the second groove, and the first groove, the second groove, and the through-hole cooperatively define the mounting hole.

19. The vehicle of claim 14, wherein the vehicle window assembly comprises a limiting member disposed on the sidewall of the accommodating space, the limiting member is disposed in a direction parallel to an extension direction of the guide rail, the mounting member defines a first limiting groove at a peripheral side end of the mounting member close to the sidewall, the first limiting groove is corresponding to the limiting member, and at least part of the limiting member is disposed in the first limiting groove.

* * * * *